United States Patent
Keller et al.

(10) Patent No.: US 9,424,684 B2
(45) Date of Patent: Aug. 23, 2016

(54) SYSTEM, METHOD, AND COMPUTER PROGRAM PRODUCT FOR SIMULATING LIGHT TRANSPORT

(71) Applicant: NVIDIA Corporation, Santa Clara, CA (US)

(72) Inventors: Alexander Keller, Berlin (DE); Ken Patrik Dahm, Berlin (DE); Nikolaus Binder, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 312 days.

(21) Appl. No.: 13/962,877

(22) Filed: Aug. 8, 2013

(65) Prior Publication Data

US 2015/0042652 A1  Feb. 12, 2015

(51) Int. Cl.
*G06T 15/50* (2011.01)

(52) U.S. Cl.
CPC ................................ *G06T 15/506* (2013.01)

(58) Field of Classification Search
None
See application file for complete search history.

(56) References Cited

U.S. PATENT DOCUMENTS

| | | | |
|---|---|---|---|
| 6,535,837 B1 * | 3/2003 | Schach Von Wittenau | A61N 5/1031 378/64 |
| 7,884,820 B2 | 2/2011 | Zhou et al. | |
| 8,279,220 B1 | 10/2012 | Pantaleoni | |
| 8,558,835 B2 | 10/2013 | Keller et al. | |
| 8,847,957 B1 * | 9/2014 | Keller | G06T 15/06 345/420 |
| 2003/0179197 A1 | 9/2003 | Sloan et al. | |
| 2011/0025682 A1 | 2/2011 | Keller et al. | |
| 2012/0038643 A1 | 2/2012 | Keller et al. | |
| 2014/0168783 A1 | 6/2014 | Luebke et al. | |

FOREIGN PATENT DOCUMENTS

WO  2009044282 A2  4/2009

OTHER PUBLICATIONS

Jensen, "A practical guide to global illumination using ray tracing and photon mapping," Aug. 2004, ACM, pp. 33-36.*
Arikan et al., "Fast and Detailed Approximate Global Illumination by Irradiance Decomposition," Jul. 2005, ACM, pp. 1108-1110.*
Veach et al., "Optimally combining sampling techniques for Monte Carlo rendering," Aug. 1995, ACM, pp. 419-424.*
Dammertz et al., "A Hierarchical Automatic Stopping Condition for Monte Carlo Global Illumination," in Proc. of the WSCG 2009, pp. 1-6.
Dammertz et al., "Progressive Point-Light-Based Global Illumination," Computer Graphics Forum, vol. 29, No. 8, 2010, pp. 1-11.
Grunschloss et al., "Enumerating Quasi-Monte Carlo Point Sequences in Elementary Intervals," Monte Carlo and Quasi-Monte Carlo Methods 2010, Springer, 2012, pp. 1-10.
Hickernell et al., "Extensible Lattice Sequences for Quasi Monte Carlo Quadrature," SIAM J. Sci. Comput., vol. 22, 2001, pp. 1-22.

(Continued)

*Primary Examiner* — Andrew G Yang
(74) *Attorney, Agent, or Firm* — Zilka-Kotab, PC

(57) ABSTRACT

A system, method, and computer program product are provided for simulating light transport. In operation, a distribution function is decomposed utilizing a technique for sampling from a probability distribution (e.g. the Alias Method, etc.). Additionally, light transport associated with at least one scene is simulated utilizing information associated with the decomposed distribution function.

18 Claims, 7 Drawing Sheets

(56) References Cited

OTHER PUBLICATIONS

Jensen, H., "Realistic Image Synthesis Using Photon Mapping," AK Peters, 2001, pp. 1-181.
Kajiya, J., "The Rendering Equation," In Computer Graphics (Proc. SIGGRAPH 1986), vol. 20, No. 4, Aug. 18-22, 1986, pp. 143-150.
Kollig et al., "Efficient Bidirectional Path Tracing by Randomized Quasi-Monte Carlo Integration," Monte Carlo and Quasi-Monte Carlo Methods 2000, Springer, 2002, pp. 1-16.
Kollig et al., "Illumination in the Presence of Weak Singularities," Monte Carlo and Quasi-Monte Carlo Methods 2004, Springer, 2004, pp. 1-13.
Lafortune, E., "Mathematical Models and Monte Carlo Algorithms for Physically Based Rendering," PhD thesis, Katholieke Universitiet Leuven, 1996, pp. 1-142.
Matusik et al., "A Data-Driven Reflectance Model," ACM Transactions on Graphics (Proc. SIGGRAPH 2003), vol. 22, No. 3, Jul. 2003, pp. 1-11.
Ngan et al., "Experimental Analysis of BRDF Models," in Rendering Techniques 2005 (Proc. 13th Eurographics Symposium on Rendering), 2005, pp. 1-11.
Niederreiter, H., "Random Number Generation and Quasi-Monte Carlo Methods," Society for Industrial and Applied Mathematics, 1992, pp. 1-241.
Parker et al., "OptiX: A General Purpose Ray Tracing Engine," ACM Transactions on Graphics (TOG), Proceedings of ACM SIGGRAPH 2010, vol. 29, No. 4, Article No. 66, 2010, pp. 1-13.
Rusinkiewicz, S., "A New Change of Variables for Efficient BRDF Representation," In Rendering Techniques (Proc. Eurographics Workshop on Rendering), Springer, 1998, pp. 1-12.
Secord et al., "Fast Primitive Distribution for Illustration," In 13th Eurographics Workshop on Rendering, 2002, pp. 215-226.
van Antwerpen, D., "Unbiased Physically Based Rendering on the GPU," Thesis, Computer Graphics Research Group, Department of Software Technology Faculty EEMCS, Delft University of Technology, 2011, pp. 1-160.
Veach, E., "Robust Monte Carlo Methods for Light Transport Simulation," PhD thesis, Stanford University, 1997, pp. 1-406.
Vose, M., "A Linear Algorithm for Generating Random Numbers with a Given Distribution," IEEE Transactions on Software Engineering, vol. 17, No. 9, Sep. 1991, pp. 972-975.
International Search Report and Written Opinion from International Application No. PCT/US2014/050437, dated Nov. 25, 2014.
Dahm, K., "A Comparison of Light Transport Algorithms on the GPU," Master∈™ s thesis, Computer Graphics Group, Saarland University, 2011, pp. 1-139.

* cited by examiner

SYSTEM, METHOD, AND COMPUTER PROGRAM PRODUCT FOR SIMULATING LIGHT TRANSPORT

FIELD OF THE INVENTION

The present invention relates to image synthesis, and more particularly to efficient photorealistic image synthesis.

BACKGROUND

Photorealistic image synthesis is concerned with the computer simulation of taking a photograph in the real world. Synthesizing such images that cannot be distinguished from real photographs includes identifying all light transport paths that connect the light sources with a camera device and summing up their contributions.

Evaluating the optical properties of surfaces and simulating how they scatter photons are core routines in light transport simulation algorithms. Many mathematical models have been developed for this purpose. However, the visual quality of such mathematical models has been limited due their approximate nature.

In contrast, measured material data can capture the physical behavior of surfaces in a much more precise way. While the evaluation of measured data is straightforward, simulating photon scattering using such data so far has not been very efficient, especially on SIMD (Single Instruction, Multiple Data) and SIMT (Single-Instruction, Multiple-Thread) architectures.

Thus, there is a need for addressing this issue and/or other issues associated with the prior art.

SUMMARY

A system, method, and computer program product are provided for simulating light transport. In operation, a distribution function is decomposed utilizing a technique for sampling from a probability distribution (e.g. the Alias Method, etc.). Additionally, light transport associated with at least one scene is simulated utilizing information associated with the decomposed distribution function.

DETAILED DESCRIPTION

Figure 1:
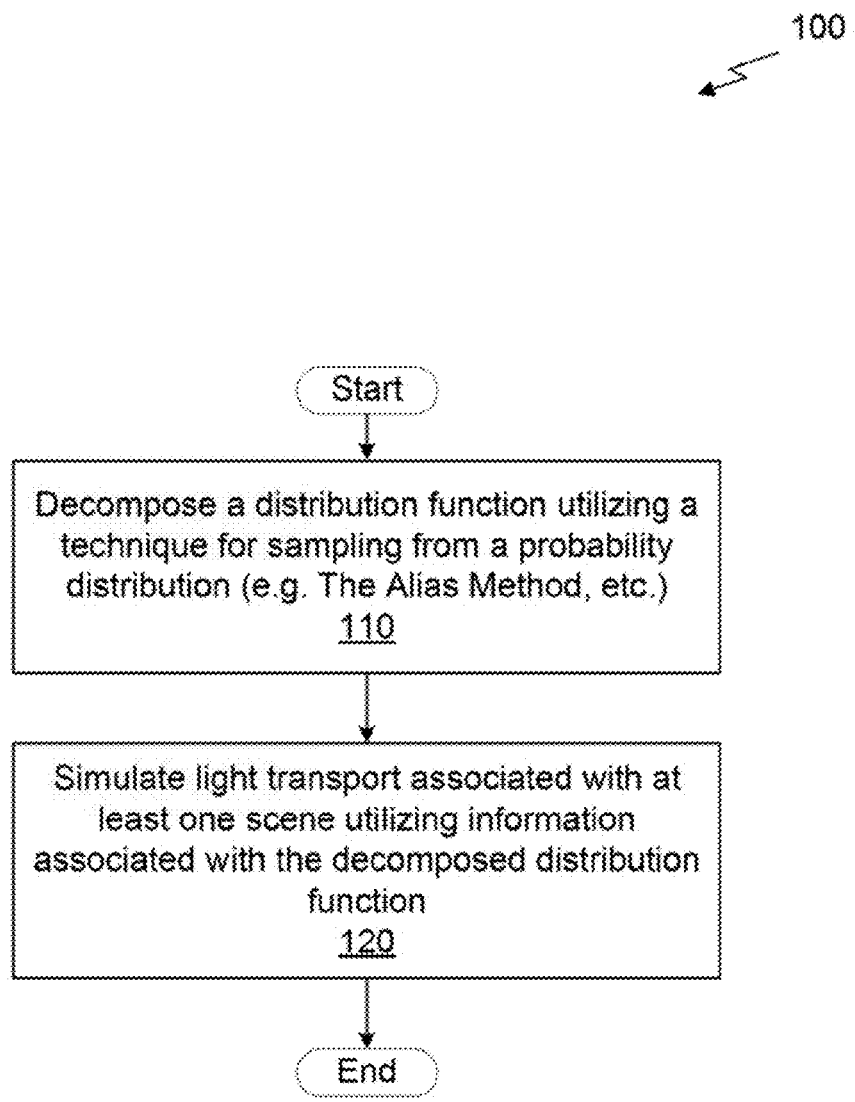
FIG. 1 illustrates a flowchart of a method for simulating light transport, in accordance with one embodiment.

FIG. 1 illustrates a flowchart of a method 100 for simulating light transport, in accordance with one embodiment. As shown in operation 110, a distribution function is decomposed utilizing a technique for sampling from a probability distribution. Additionally, as shown in operation 120, light transport associated with at least one scene is simulated utilizing information associated with the decomposed distribution function.

In one embodiment, the technique for sampling from a discrete probability distribution may include the Alias Method. The Alias Method refers to a known family of efficient algorithms for sampling from a probability distribution. More details associated with the Alias Method are described below.

In one embodiment, the distribution function may include a measured bidirectional reflectance distribution function (BRDF). Furthermore, the measured distribution function may include any measured distribution function associated with any number of materials and/or objects. In some cases, the measured distribution function may be obtained from a database including pre-measured distribution functions.

In various embodiments, decomposing the distribution function may include a various number of steps and/or functions. In one embodiment, decomposing the measured distribution function may include decomposing the measured distribution function into at least one first portion to be evaluated by shadow rays. Additionally, in one embodiment, decomposing the measured distribution function may include decomposing the measured distribution function into at least one second portion to be simulated utilizing scattering. In this case, in one embodiment, simulating the light transport may include evaluating the at least one first portion utilizing the shadow rays and/or simulating the at least one second portion utilizing scattering.

Further, in one embodiment, decomposing the measured distribution function may include partitioning distributions. In this case, in one embodiment, simulating the light transport may include simulating each of the partitioned distributions.

In one embodiment, in the case that the technique for sampling from a discrete probability distribution includes the Alias Method, low discrepancy sequences may be mapped to the Alias Method. In this case, the mapping of the low discrepancy sequences may function to allow for simulating discrete densities without floating point computation. In another embodiment, an integer portion of rational low discrepancy sequences may be used as a permutation and index to access tables associated with the Alias Method. Furthermore, in one embodiment, an alias probability table and an alias table resulting from the Alias Method may be used to partition discrete densities into a uniform portion and a non-uniform portion.

Still yet, in one embodiment, the measured distribution function may include a measured BRDF and a partition may distinguish a portion that is easy to integrate and a portion that is efficient to simulate. In this case, in one embodiment, the partition may be applied to partition path space.

In another embodiment, the method 100 may include combining a bidirectional path tracing technique and a progressive photon mapping technique using implicit multiple importance sampling, which is described in further detail herein. In this case, in one embodiment, the bidirectional path tracing technique and the progressive photon mapping technique may be selected based on weights. In another embodiment, the bidirectional path tracing technique and the progressive photon mapping technique may be selected algorithmically.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
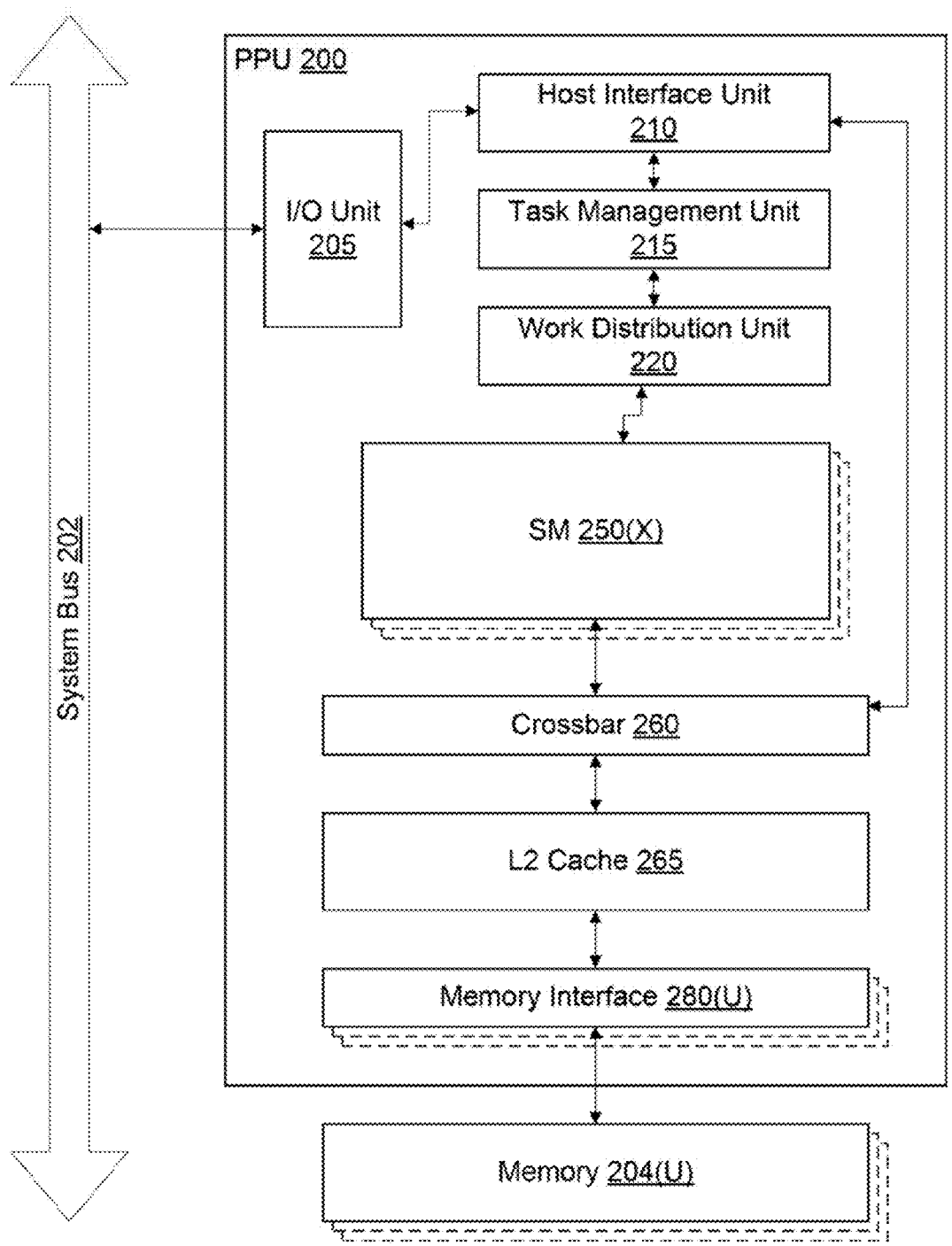
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 comprises X streaming multi-processors (SMs) 250 and is configured to execute a plurality of threads concurrently in two or more of the SMs 250(X). A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. In one embodiment, the PPU 200 comprises U memory interfaces 280(U), where each memory interface 280(U) is connected to a corresponding memory device 204(U). The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. In one embodiment, a thread block comprises 32 related threads and a grid is an array of one or more thread blocks that execute the same stream and the different thread blocks may exchange data through global memory. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMT (Single-Instruction, Multiple-Thread) architecture where each thread block (i.e., warp) in a grid is concurrently executed on a different data set by different threads in the thread block. The driver kernel defines thread blocks that are comprised of k related threads, such that threads in the same thread block may exchange data through shared memory.

In one embodiment, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
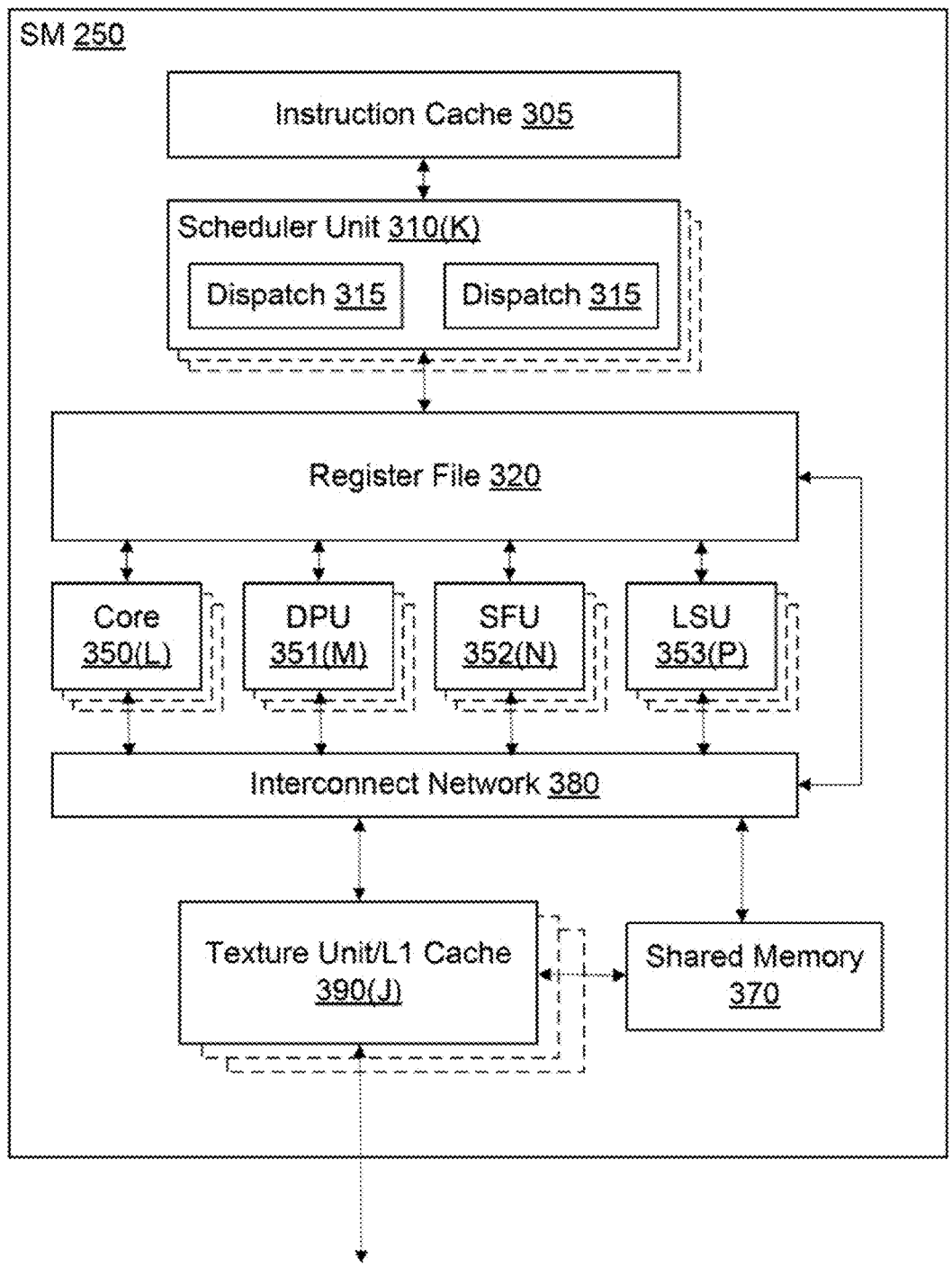
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 350 includes a register file 320 that provides a set of registers for the functional units of the SM 350. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. In one embodiment, the texture unit/L1 caches 390 may be configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

In one embodiment, the systems described herein may be utilized to efficiently simulate light transport. For example, based on the Alias Method that has been developed for efficient particle simulation on SIMD architectures, new algorithms for using measured data in photorealistic image synthesis may be implemented. The benefits of implementing such algorithms include higher image fidelity, increased efficiency, and a simpler implementation, which are implemented with a focus on light transport simulation with measured reflectance data.

Previously, the Alias Method has only been used to simulate discrete densities on SIMD architectures. In one embodiment of the present invention, however, the use of the Alias Method may be extended to partitioning distributions and simulating each of the partitions with a simulation method. Furthermore, in one embodiment, a mapping of low discrepancy sequences may be utilized in context of the Alias Method to allow for simulating discrete densities without resorting to floating point computation. This has advantages over previous techniques that had to cope with effects of cancellation in long sums (such as computing cumulative distribution functions, etc.).

In another embodiment, the Alias Method may be utilized to decompose a measured BRDF into portions that can be evaluated by shadow rays and portions that are better simulated using scattering. This particular algorithm may be implemented to reduce instruction as well as memory divergence in a SIMD or SIMT architecture to the bare minimum of O(1).

Modern processors draw a part of their efficiency from a SIMD or SIMT architecture. A known issue with such architectures is divergence. One way to execute different instructions across the multiple lanes of data is to mask out lanes, which reduces the efficiency.

In the practical case of scattering photons, this means that performance is sacrificed, whenever different lanes have to simulate different mathematical models of surface properties. Abstracting, there is a need for a data structure and algorithm that allows for efficiently sampling from different probability density functions across the lanes of a SIMD or SIMT architecture.

The Alias Method addresses such issues. See, for example, "A linear algorithm for generating random numbers with a given distribution" (M. Vose, IEEE Trans. on Software Engineering, 17(9):972-975, 1991) and references therein, which describes Alias Method examples and is hereby incorporated by reference in its entirety.

Different discrete probability distribution functions can be simulated across lanes, while the same instructions are executed synchronously. The Alias Method utilizes an alias map $a_i$: $\{0, \ldots, n-1\} \rightarrow \{0, \ldots, n-1\}$ for $0 \leq i < n$ and corresponding probabilities $q_i \in [0,1]$ such that the given discrete probability density function (Algorithm 1)

$$p(x) := \sum_{i=0}^{n-1} \chi_i(x) p_i = \frac{1}{n} \sum_{i=0}^{n-1} (\chi_i(x) q_i + \chi_{a_i}(x)(1 - q_i))$$

can be represented as a sum of terms, each with probability 1/n. Here, $\chi_i$ is the characteristic function of the interval $$\left[\frac{i}{n}, \frac{i+1}{n}\right).$$

Given such a representation, sampling is a two-step procedure. First, a term i is uniformly selected. The second decision is to select either i or its alias $a_i$ by comparing a number selected uniformly in [0,1) to $q_i$. The algorithm can be implemented using only one uniform number, which needs to be multiplied by n. The integer part is taken to be i, while the fraction is used to decide for either i or its alias $a_i$ (as before). While this variant is very elegant, one must guarantee that the fraction still provides a sufficient number of uniform digits in order to avoid a deviation from the targeted distribution.

Figure 4:
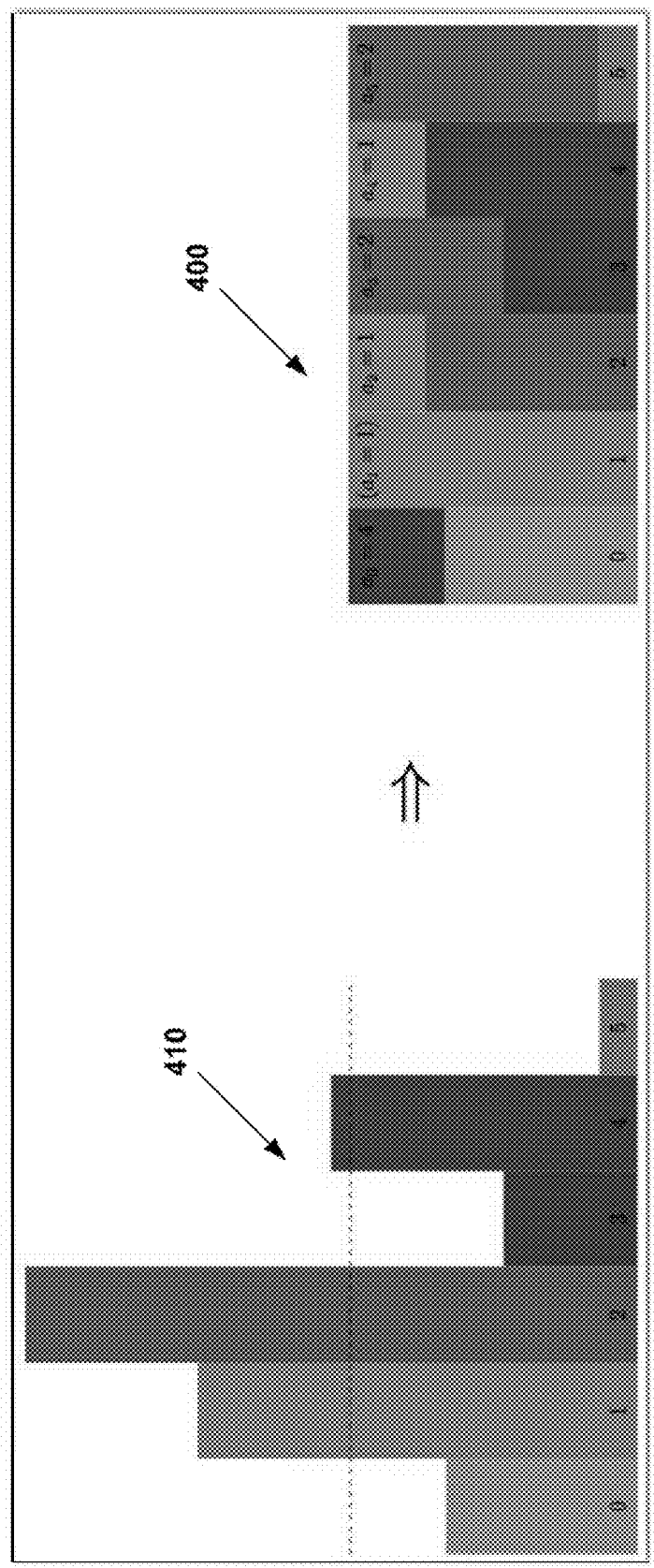
FIG. 4 illustrates an exemplary alias map created utilizing a discrete probability distribution, in accordance with one embodiment.

FIG. 4 illustrates an exemplary alias map 400 created utilizing a discrete probability distribution 410, in accordance with one embodiment. As an option, the map 400 may be viewed in the context of the previous Figures and/or any subsequent Figure(s). Of course, however, the map 400 may be viewed in the context of any desired environment. It should also be noted that the aforementioned definitions may apply during the present description.

An alias map 400 constructed from the discrete probability distribution 410 allows for generating samples according to the given discrete probability distribution by uniformly selecting one of the columns and then deciding for either the column or its alias.

Given the discrete probability density $p_i \in [0,1]$, $\Sigma_{i=0}^{n-1} p_i = 1$, the algorithm in Listing 1 constructs the alias map $a_i$ and according probabilities $q_i$ in linear time. During construction, an additional permutation array is required that keeps track of the partition of probabilities below and above 1/n. Looking at the implementation, it becomes apparent that the alias map $a_i$ is injective as locations can be referenced more than once. Probabilities $p_i < 1/n$ are never modified, while the mass of probabilities $p_i \geq 1/n$ becomes distributed. Both for-loops run in at most O(n) and termination is unconditionally stable, as it does not depend on floating point precision. Note that while the algorithm is deterministic, the construction of the alias map is not unique.

Similar to computing the cumulative distribution function (CDF), care must be taken when normalizing density functions. Kahan-summation or hierarchical summation can help to ameliorate the effects of cancellation when summing large arrays of numbers. Listing 1 shows exemplary code for alias map construction, in accordance with one embodiment.

Listing 1

```
1    void build(
2        // In: Un -normalized probabilities
3        std::vector <float >& aP ,
4        // Out: Q's
5        std::vector <float >& aQ ,
6        // Out: Alias map
7        std::vector <unsigned int >& aAliasMap)
8    {
9        // Allocate memory
10       aQ.resize(aP.size( ));
11       aAliasMap.resize(aP.size( ));
12
13       // Normalize probabilities
14       float sum = 0.0f;
15       for (unsigned int i=0u; i < aP.size( ); ++i)
16           sum + = aP[i];
17       for (unsigned int i=0u; i < aP.size( ); ++i)
18           aP[i] /= sum;
19
20       // Partition in larger and smaller than 1 / n
21       std::vector <unsigned int> partitionTable(aP.size( ));
22       unsigned int s = 0u, l = aP.size( );
23       for (unsigned int i=0u; i < aP.size( ); ++i)
24       {
25           aAliasMap[i] = i;
26           aQ[i] = aP[i] * aP.size ( );
27           partitionTable[aQ[i] <1.0f? s++ : --l] = i;
28       }
29
30       // Create map
```

```
                                            Listing 1

31            for (s = 0; s < 1 && 1 < aP.size( ); ++s)
32            {
33                const unsigned int j = partitionTable[s], k =
                     partitionTable[1];
34                aAliasMap[j] = k;
35                aQ[k] += aQ[j] – 1.0f;
36                1 = aQ[k] < 1.0f? 1 + 1u : 1;
37            }
      38    }
```

As noted, in one embodiment, low discrepancy sequences may be mapped to the Alias Method to allow simulating discrete densities without floating point computation.

For example, (t, s)-sequences in base b are defined as sequences of (t, m, s)-nets in base b, which consist of $b^s$ points in the s-dimensional unit cube. See, for example, "Random Number Generation and Quasi-Monte Carlo Methods" (H. Niederreiter, SIAM, Philadelphia, 1992), which is incorporated by reference in its entirety.

This subset property is of special interest for (0, 1)-sequences, where integer parts of each (0, m, 1)-net multiplied by $b^m$ are a permutation of $\{0, \ldots, b^m-1\}$. Such sequences include the van der Corput sequences as well as the components of rank-1 lattice sequences, where the corresponding component of the generator vector is co-prime to b. More information associated with rank-1 lattice sequences may be found in "Extensible lattice sequences for quasi-Monte Carlo quadrature" (F. Hickernell, H. Hong, P. L'Ecuyer, and C. Lemieux, SIAM J. Sci. Comput., 22:1117-1138, 2001), which is hereby incorporated by reference in its entirety.

Given that $b^m$ matches the size of the data structures of the Alias Method, the permutations can be used as array indices avoiding any floating point computation and conversion and thus resulting in perfect precision. For higher dimensions and t=0 the same properties guarantee that each element of the alias map data structure is addressed exactly once before repetitions can occur. In various embodiments, either an inversion method or the Alias Method may be used to direct adaptive sampling. More information associated with the inversion method may be found in "Fast primitive distribution for illustration" (A. Secord, W. Heidrich, and L. Streit, in $13^{th}$ Eurographics Workshop on Rendering, pages 215-226), which is hereby incorporated by reference in its entirety.

Samples inside the interval associated with a probability can be enumerated as introduced in "Enumerating Quasi-Monte Carlo Point Sequences in Elementary Intervals" (L. Grünschloβ, M. Raab, and A. Keller, In L. Plaskota and H. Woźniakowski, editors, Monte Carlo and Quasi-Monte Carlo Methods 2010, pages 399-408. Springer, 2012), which is incorporated by reference in its entirety. This process enumerates a subset of a low discrepancy sequence, whose density is proportional to the desired discrete probability distribution. In a similar way, the Alias Method may be used to realize consistent adaptive sampling as described in "A hierarchical automatic stopping condition for Monte Carlo global illumination" (H. Dammertz, J. Hanika, A. Keller, and H. Lensch, in Proc. of the WSCG 2009, pages 159-164, 2009), and U.S. patent application Ser. No. 12/512,782, filed Jul. 30, 2009 and titled "System, method, and computer program product for consistent image synthesis," which are hereby incorporated by reference in their entirety.

Further, more information associated with low discrepancy sequences may be found in "Random Number Generation and Quasi-Monte Carlo Methods" (H. Niederreiter, SIAM, Philadelphia, 1992), which is incorporated by reference in its entirety.

In the context of distribution functions, there are differences between simple mathematical models and measured bidirectional reflectance distribution functions (BRDF). Not surprisingly, a small number of basis functions are not able to capture the subtleties of measured data efficiently.

Reflectance data is high dimensional as it can depend on incidence and reflectance direction, on wavelength, and location. Measuring along all these 7 dimensions would result in huge data. For the scope of this description, isotropic BRDF data measured in one location is considered, which can be represented by a block of 3-dimensional data for each wavelength. Such measurements can be found on the web, for example, in the Columbia-Utrecht Reflectance and Texture Database (CuRET), in the measurement data of the Cornell University Program of Computer Graphics, and in the Mitsubishi Electric Research Laboratories (MERL) BRDF Database, see, for example, "A Data-Driven Reflectance Model" (W. Matusik, H. Pfister, M. Brand, and L. McMillan, ACM Transactions on Graphics (Proc. SIGGRAPH 2003), 22(3): 759-769), which is hereby incorporated by reference in its entirety.

More measurements may be found in, for example, the anisotropic data accompanying "Experimental Analysis of BRDF Models" (A. Ngan, F. Durand, and W. Matusik, In Rendering Techniques 2005 (Proc. $13^{th}$ Eurographics Symposium on Rendering), pages 117-226. Eurographics Association, 2005), which is hereby incorporated by reference in its entirety.

Figure 5:
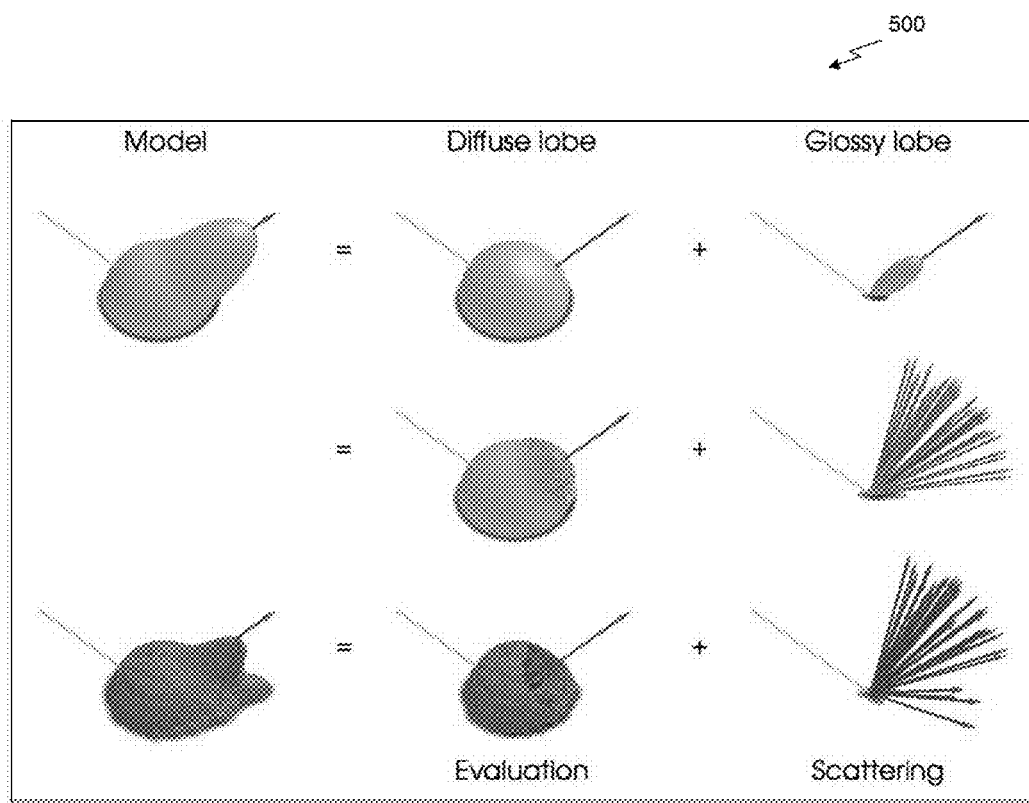
FIG. 5 illustrates a distribution decomposition example, in accordance with one embodiment.

FIG. 5 illustrates a distribution decomposition example 500, in accordance with one embodiment. As an option, the distribution decomposition example 500 may be viewed in the context of the previous Figures and/or any subsequent Figure(s). Of course, however, the distribution decomposition example 500 may be viewed in the context of any desired environment. It should also be noted that the aforementioned definitions may apply during the present description.

FIG. 5 illustrates how the construction of an alias map decomposes a Phong BRDF model into a part that is easy to integrate and a part that is more effectively evaluated by scattering, in accordance with one embodiment. The bottom row illustrates the decomposition for the example of measured data from violet rubber. The top row of FIG. 5 illustrates the analytic approach to representing reflectance behavior by a linear combination of basis functions for the example of the Phong model.

The simulation of such models includes applying the composition or Alias Method to select a basis function followed by sampling the selected basis function using the inversion method. In order to increase efficiency, rendering algorithms often rely on a classification of BRDF basis functions in more diffuse and more glossy basis functions. See, for example, "Progressive pointlight-based global illumination" (H. Dammertz, A. Keller, and H. Lensch, Computer Graphics Forum, 29(8):2504-2515, 2010), which is hereby incorporated by reference in its entirety.

For discrete measured data, such a classification is not obvious. While both the Alias Method and the inversion method can be readily applied to simulate scattering, it can be more efficient to decompose the data into a part that is easy to integrate and a part that is easy to simulate.

Given a fixed direction $\omega_{in}$ of incidence, then a measured bidirectional reflectance distribution function (BRDF) $f_r(\omega, x, \omega_{in})$ in a point x can be considered an array of data, where each element $f_i$ represents measured reflectivity and its position i in the array specifies the directional dependence. For the sake of simplicity, a discrete probability density function $$p_i = \frac{f_i}{\sum_i f_i}$$

is deduced by normalizing the maximum color/spectral component $f_i = \|f_{r,i}\|_\infty$ of the measured BRDF.

Now the application of the Alias method of Algorithm 1 to a measured BRDF $$f_r(\omega) = f_r(\omega) \frac{p(\omega)}{p(\omega)}$$

$$f_r(\omega) \frac{\sum \chi_i(\omega) q_i}{np(\omega)} + f_r(\omega) \frac{\sum \chi_{a_i}(\omega)(1 - q_i)}{np(\omega)}$$

results in a decomposition as illustrated in FIG. 5. The first term is simple to evaluate by lookup, while the second term consisting of the aliases lends itself to scattering. Uniformly selecting a summand from the second term allows one to determine a scattering direction using the alias $a_i$ in a straightforward way, unless $q_i=1$, in which case there is no scattering (in fact resembling Russian roulette path termination). Similarly, no shadow rays need to be shot for $q_i=0$ when evaluating the first term.

The probability of the evaluation component is $$p_e := \frac{1}{n} \sum_{i=0}^{n-1} q_i,$$

while $p_s:=1-p_e$ is the one for scattering. In analogy to the classification of BRDF component in diffuse and glossy, both probabilities can be used for Russian roulette path termination as for example in path space partitioning, or photon map generation. More information associated with path space partitioning may be found in "Progressive pointlight-based global illumination" (H. Dammertz, A. Keller, and H. Lensch, Computer Graphics Forum, 29(8):2504-2515, 2010), which is hereby incorporated by reference in its entirety. More information associated with photon map generation may be found in "Image Synthesis Using Photon Mapping" (H. Jensen, A K Peters, 2001), which is hereby incorporated by reference in its entirety.

Figure 6:
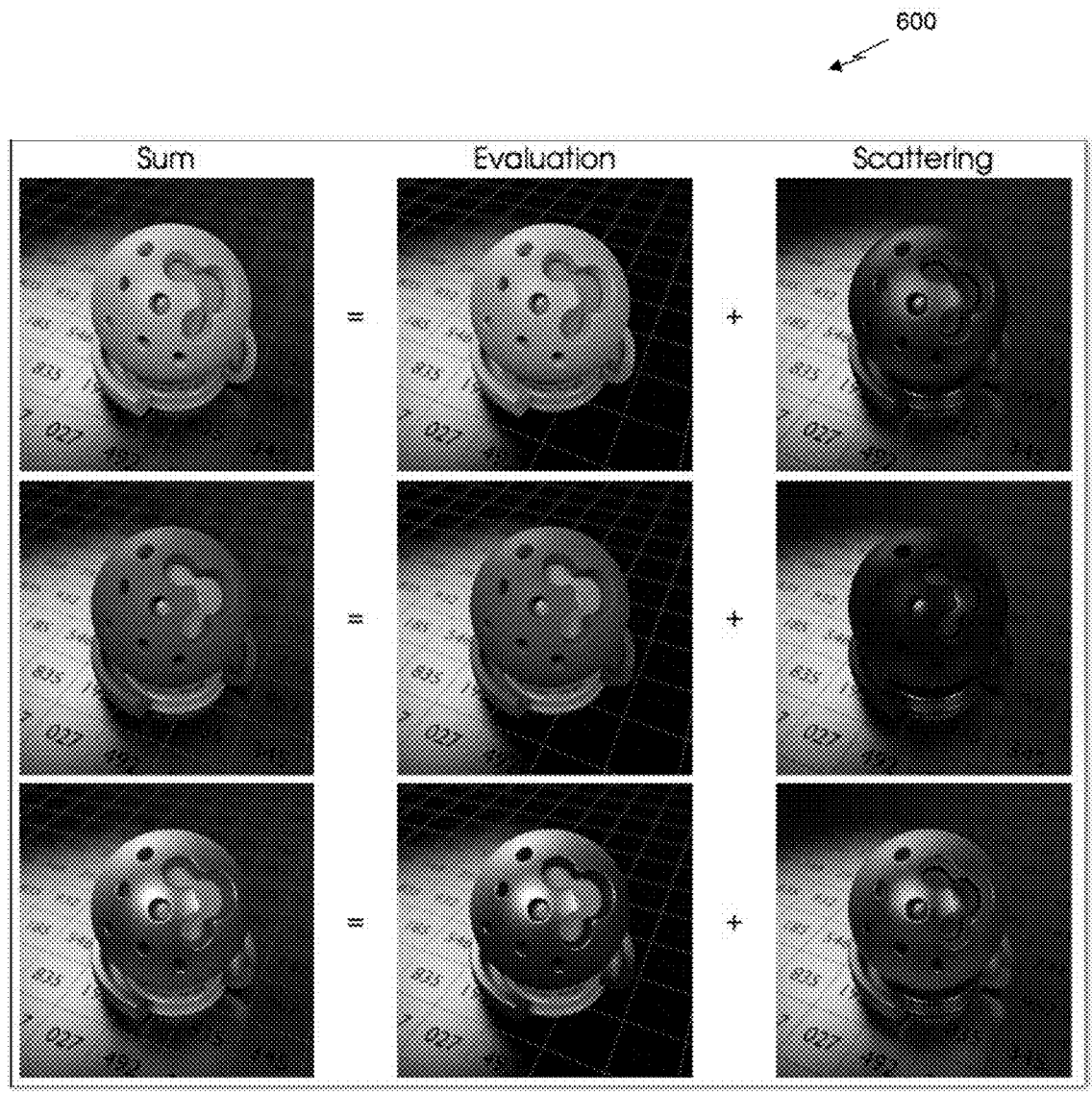
FIG. 6 illustrates a decomposition of a light transport simulation example, in accordance with one embodiment.

FIG. 6 illustrates a decomposition of a light transport simulation example 600, in accordance with one embodiment. As an option, the example 600 may be viewed in the context of the previous Figures and/or any subsequent Figure(s). Of course, however, the example 600 may be viewed in the context of any desired environment. It should also be noted that the aforementioned definitions may apply during the present description.

FIG. 6 shows an example of decomposition of light transport simulation into evaluation and scattering. The part that can be evaluated is lit using shadow rays and includes all BRDF components that are smaller than its average. The remaining part is the contribution of the alias map, which is evaluated by scattering and comprises the parts of the distribution that are above its average. The top row shows a Phong BRDF, the middle row violet rubber, and the bottom row silver metallic paint.

Example 600 utilizes measured BRDF Data from the MERL Database to illustrate the decomposition approach for light transport simulation. The measured BRDF data has been taken from the MERL database of isotropic BRDFs. See, for example, "A Data-Driven Reflectance Model" (W. Matusik, H. Pfister, M. Brand, and L. McMillan, ACM Transactions on Graphics (Proc. SIGGRAPH 2003), 22(3):759-769), which is hereby incorporated by reference in its entirety.

The parameterization underlying the MERL data exposes high sample density around the reflection lobes.

More information associated with parameterization may be found in "A new change of variables for efficient BRDF representation" (S. Rusinkiewicz, in Rendering Techniques (Proc. Eurographics Workshop on Rendering), pages 11-28, Springer Verlag, 1998), which is hereby incorporated by reference in its entirety.

As the parameterization requires both incident and reflection direction to evaluate the BRDF data access it does not lend itself for simple use in scattering simulation. In addition, enumerating the data items and applying the inverse parameterization to compute the associated pairs of incident and reflected direction reveals that the incident directions need to be quantized in order to use them for scattering simulation.

For this example, for an isotropic BRDF, a number of uniform buckets are fixed along the θ dimension of the incident directions, then all data items are enumerated, and the counter of the bucket containing the angle θ of the direction of incidence of the data item is increased. Only data items with valid direction pairs need to be considered.

The counters then determine the memory that needs to be allocated to keep the data for the alias maps. The arrays are filled by enumerating the data items a second time. Finally all arrays are processed to yield an alias maps for each bucket of θ. Given an incident direction, its angle θ determines the alias map to use for scattering simulation.

For modeling with measured materials, one way to take advantage of the Alias Method with measured materials is to offer it as a dictionary function in the context of layered materials. A simple special case of this approach is to represent specular behavior separate from the remaining reflection behavior captured by measured data. In order to model varying surface properties, a texture with references to measured materials can be used in the obvious way. In addition measured material data structures can be generated algorithmically, be processed algorithmically similar to image processing, and even can be designed or "painted" by artists.

Due to its ease of the implementation, its speed of sample generation, and its suitability to SIMD and SIMT architectures, the Alias Method may be utilized in the context of light transport simulation. Beyond the straightforward application, the function decomposition induced by the alias map construction is introduced as a new concept to increase efficiency.

With respect to sampling multiple lights, the alias method may be applied in order to select one out of many light sources. Using an image for lighting, each pixel can be considered an individual light source. Often importance sampling is realized using a MIP map and samples according to the light distribution are generated by traversing the MIP map hierarchy. Again, the Alias Method can be applied in a straightforward way in order to avoid hierarchy traversal. In some cases, attention must be paid to the fact that floating point numbers may not provide a sufficient number of bits to access all entries of the alias map. Similarly using a one-dimensional access to a two dimensional image may expose correlation artifacts with the underlying sampling scheme.

As such, care has to be taken that a sufficient number of uniform bits are provided to the Alias Method. For example, if one component of the Halton sequence is used artifacts will exist. While the artifacts would vanish in the limit, they persist for quite some time. Using two components to access the alias map removes the issue. The same is true when using the one-dimensional inversion method with the cumulative distribution function on two-dimensional data.

In one embodiment, an efficient and simple path tracer may be derived that benefits both from powerful variance reduction and the increased realism of measured material simulated by the Alias Method. More information associated with efficient path tracing may be found in "The Rendering Equation" (in Computer Graphics (Proc. SIGGRAPH 1986), pages 143-150, 1986), which is hereby incorporated by reference in its entirety.

For example, the effect of implicit multiple importance sampling in a simple path tracer with next event estimation shows that the improvement due to the multiple importance sampling weights is dramatic on glossy surfaces, large area lights, and environment lighting, while it may be less perceivable on diffuse surfaces.

Generating light transport paths is based on two basic techniques: scattering in order to prolong a path segment and tracing shadow rays in order to connect mutually visible vertices of path segments. Unless the choice of technique is obvious, multiple importance sampling can combine the techniques such that the variance can be reduced.

More information associated with multiple importance sampling may be found in "Robust Monte Carlo Methods for Light Transport Simulation" (E. Veach, PhD thesis, Stanford University, 1997), and "Mathematical Models and Monte Carlo Algorithms for Physically Based Rendering" (E. Lafortune, PhD thesis, Katholieke Universitiet Leuven, Belgium, 1996), which are hereby incorporated by reference in their entirety.

Given a function $f(x)$ to be integrated and multiple densities $p_i(x)$ that can be evaluated and sampled, the idea of multiple importance sampling is to use a linear combination $\Sigma_{i=0}^{m-1} w_i(x) p_i(x) = 1 \, \forall x \in \text{supp} \, f$ to transform the integral $$\int_D f(x) \, dx = \int_D \underbrace{\sum_{i=0}^{m-1} w_i(x) p_i(x)}_{=1 \forall x} f(x) \, dx$$

$$= \sum_{i=0}^{m-1} \int_{(0,1)^s} w_i(x) f(x) \, dP_i(x).$$

Each of the resulting m integrals then can be evaluated by averaging samples generated according to $p_i(x)$ weighted by $w_i(x)$.

The so-called balance heuristic $$w_i(x) \equiv w(x) := \frac{1}{\sum_{j=0}^{m-1} p_j(x)}$$

is an example for a set of weights, where obviously the weighted linear combination of densities sums up to one for any value of x.

Other heuristics (e.g. the power heuristic, etc.) may be found in "Robust Monte Carlo Methods for Light Transport Simulation" (E. Veach, PhD thesis, Stanford University, 1997), and "Mathematical Models and Monte Carlo Algorithms for Physically Based Rendering" (E. Lafortune, PhD thesis, Katholieke Universitiet Leuven, Belgium, 1996), which are hereby incorporated by reference in their entirety.

Samples x for which $p_i(x)=0$ obviously cannot be generated, which requires $w_i(x)=0$ to make the method work. As a direct consequence, for any x at least one density must be positive, i.e. $p_i(x)>0$. It may well happen that this cannot be guaranteed, which is called the problem of insufficient techniques. See, for example, "Efficient bidirectional path tracing by randomized quasi-Monte Carlo integration" (T. Kollig and A. Keller, in H. Niederreiter, K. Fang, and F. Hickernell, editors, Monte Carlo and Quasi-Monte Carlo Methods 2000, pages 290-305. Springer, 2002), which is hereby incorporated by reference in its entirety.

As an example of direct illumination, given an emission distribution $L_e$ on the scene surface, the direction illumination $$\int_{s_-^2(x)} L_e(h(x,\omega)) f_r \cos\theta_x d\omega = \int_{\text{supp} L_e} L_e(y) V(x,y) f_r \cos\theta_x \frac{\cos\theta_y}{|x-y|^2} dy$$

is equivalently determined by either integrating over the solid angle or the area, i.e. the support of $L_e$. Selecting the two densities $$p(w) := f_r \cos\theta_x \text{ and } p(y) := 1,$$

these can be turned into techniques by simulating a scattering direction according to p(w) using the alias or inversion method, and generating uniform samples on the light sources according to p(y).

Given the hit point $y := h(x,w)$, the visibility $V(x,y)$ is one, and the relationship $$p_\omega(y) = p(\omega) \frac{\cos\theta_y}{|x-y|^2}$$

transforms a density with respect to the solid angle into a density with respect to a visible point on a surface. See, for example, "Mathematical Models and Monte Carlo Algorithms for Physically Based Rendering" (E. Lafortune, PhD thesis, Katholieke Universitiet Leuven, Belgium, 1996). The weight for the balance heuristic with respect to the area measure then is $$w(y) = \frac{1}{p(y) + p_\omega(y)}$$

$$= \frac{1}{1 + f_r \cos\theta_x \frac{\cos\theta_y}{|x-y|^2}}$$

$$= \frac{|x-y|^2}{|x-y|^2 + f_r \cos\theta_x \cos\theta_y},$$

while it is $$w(\omega) = \frac{1}{p(y) \frac{|x-y|^2}{\cos\theta_y} + p(\omega)}$$

$$= \frac{\cos\theta_y}{|x-y|^2 + f_r \cos\theta_x \cos\theta_y}$$

-continued $$\left( = \frac{(1-w(y))\frac{|x-y|^2}{\cos\theta_y}}{p(\omega)} \right)$$

with respect to the solid angle. Hence the direct illumination amounts to:

$$L_d = \int_{suppL_e} L_e(y,x)V(x,y)\frac{f_r\cos\theta_x\cos\theta_y}{|x-y|^2 + f_r\cos\theta_x\cos\theta_y}dy + \int_{s^2_-(x)} L_e(y,x)\frac{\cos\theta_y}{|x-y|^2 + f_r\cos\theta_x\cos\theta_y}f_r\cos\theta_x d\omega$$

with $y = h(x, \omega)$

The terms of the above equation are bounded, which yields finite variance Monte Carlo estimators. In a numerical algorithm, the undefined 0/0 case needs to be avoided explicitly. Both integrals contain the same term of the form a/(b+a). In order to avoid numerical exceptions, it is sufficient to test a=cos $\theta_x$ cos $\theta_y$ for zero explicitly, since then no radiation is transported. Note that testing for a<ϵ is incorrect as for small distances $|x-y|^2$<<a substantial amounts of transport can be excluded.

In one embodiment, a path tracer with next event estimation may be implemented by recycling scattering rays for multiple importance sampling. See, for example, "Mathematical Models and Monte Carlo Algorithms for Physically Based Rendering" (E. Lafortune, PhD thesis, Katholieke Universitiet Leuven, Belgium, 1996). More information associated with implicit multiple importance sampling may be found in "A comparison of light transport algorithms on the GPU" (K. Dahm, Master's thesis, Computer Graphics Group, Saarland University, Germany, 2011), and "Unbiased physically based rendering on the GPU" (D. van Antwerpen, Master's thesis, Computer Graphics Research Group, Department of Software Technology Faculty EEMCS, Delft University of Technology, the Netherlands, 2011), which are hereby incorporated by reference in their entirety.

The implementation within the NVIDIA OptiX framework is found in Listing 2. More information associated with OptiX may be found in "OptiX: A general purpose ray tracing engine" (S. Parker, J. Bigler, A. Dietrich, H. Friedrich, J. Hoberock, D. Luebke, D. McAllister, M. McGuire, K. Morley, A. Robison, and M. Stich, ACM Transactions on Graphics (TOG)—Proceedings of ACM SIGGRAPH 2010 TOG, 29(4):Article No. 66, 2010), which is hereby incorporated by reference in its entirety.

Radiance transport can be formulated recursively as radiance $L=L_e+T_fL$, which is source radiance plus transported radiance. The transported radiance $$T_fL = T_f(L_e + T_fL)$$
$$= T_f(\underbrace{(w_1p_1 + w_2p_2)}_{=1}L_e + T_fL)$$
$$= T_f(w_1p_1L_e + T_fL) + T_fw_2p_2L_e$$

can be computed by first replacing one instance of the radiance by its definition and then inserting a linear combination of weights as derived in the previous section that always sums up to one. As a result the transported radiance is determined by two terms. The first term is evaluated by integration over the hemisphere, which comprises sampling a scattering direction, tracing a ray and summing up the weighted emission $L_e$ and recursively computing the transported radiance. The second term uses a shadow ray towards the support of the light sources and the according weight as derived before.

The final implementation is realized as a for-loop in order to avoid recursion, uses Russian roulette to terminate the path, and recycles the scattering direction for next event estimation with respect to the solid angle. Thus, no additional rays need to be shot as compared to a classic path tracer implementation.

Listing 2

```
DEVICE_INLINE__
float4 getRadiance(
         const tMLTSample& aSample)
{
         // Create primary ray
         optix::Ray ray = camera.lensRadius > 0.0f ?
                  camera.generateRay(aSample.cameraSample.imageSample,
                        aSample.cameraSample.lensSample, afBuffer[0], rayTypeRadiance,
                        aHorizontalOffset) :
                  camera.generateRay(aSample.cameraSample.imageSample, rayTypeRadiance,
                        aHorizontalOffset);
         // Initialize running variables
         float4 radiance = make__float4(0.0f, 0.0f, 0.0f, 1.0f);
         float4 alpha = make__float4(1.0f);
         RayPayload payload;
         // Trace eye path
         float brdfPdf;
         bool lastSpecularBounce = true;
         for (unsigned int length=1;; ++length)
         {
               rtTrace(root, ray, payload);
         // Environment light
         const int brdfType = optix::float__as__int(payload.brdfData.data1.w);
         if (brdfType == ENVIRONMENT)
         {
                  if (mapRes.x != 0u)
                  {
                        const RadianceSample sample = getRadiance(ray.direction);
                        const, float weight = useMIS ?
                              (lastSpecularBounce ? 1.0f : 1.0f / (1.0f + sample.pdfDirect / brdfPdf)) :
```

Listing 2

```
                    (lastSpecularBounce ? 1.0f : 0.0f);
                radiance += alpha * weight * sample.radiance;
                radiance.w = 1.0f;
            }
            break;
        }
// Area light source
const float3 ns = payload.frame.getNormal( );
const float3 ng = payload.geomNormal;
if (brdfType == EMISSION)
{
    const float3 incoming = −ray.direction;
    const float cosTheta = dot(incoming, ns);
    const TriangleLight& light = triLights[optix::float_as_int(payload.brdfData.data0.w)];
    float weight = 1.0f;
    if (!lastSpecularBounce)
    {
        if(useMIS)
        {
                const RadianceSample sample = light.getRadiance(incoming);
                const float distance = optix::length(ray.origin − payload.position);
                const float lightPdfSA =
                        Math::toSolidAngleMeasure(sample.pdfDirect, cosTheta, distance);
                weight = 1.0f / (1.0f + lightPdfSA / brdfPdf);
        }
        else
                weight = 0.0f;
    }
    radiance +=
            cosTheta > 0.0f ? alpha * weight * payload.brdfData.data0 : make_float4(0.0f,
                    0.0f, 0.0f, 1.0f);
    break;
}
// Terminate path
if (length == MAX_PATH_LENGTH)
    break;
// Estimate direct illumination
float lightPickProb;
const float& lightSample = aSample.lightingSamples[length].lightPickSample;
const float3& posSamples = aSample.lightingSamples[length].positionSamples;
IlluminationSample is = sampleOneLight(payload.position, posSamples, lightSample,
        lightPickProb);
if (is.pdfDirectSolidAngle > 0.0f)
{
        IF_IS_NOT_OCCLUDED_POINT_DIR(payload.position, is.dirToLight, is.distance,
                camera.epsilon)
        {
            float pdf;
            const float4 brdfFactor = evaluate(payload.brdfData, ns,
                    −ray.direction, is.dirToLight, false, pdf);
            const float cosTheta = Math::clampDot(is.dirToLight, ns);
            const float invPdf = 1.0f / (is.pdfDirectSolidAngle * lightPickProb);
            const float weight = useMIS ?
                    (is.isDeltaLight ? 1.0f : 1.0f / (1.0f + pdf / is.pdfDirectSolidAngle)) :
                    1.0f;
            radiance += alpha * weight * brdfFactor * is.radiance * cosTheta * invPdf;
        }
}
// Sample BRDF
float3 outgoing;
const float4 brdfFactor = sample(payload.brdfData,
        aSample.cameraPathSamples[length].brdfSamples, ns,
        −ray.direction, outgoing, brdfPdf, lastSpecularBounce);
if (brdfPdf == 0.0f || dot(ng, outgoing) < 0.0f)
    break;
// Decide whether to terminate the path or to continue
const float cosTheta = Math::absDot(ns, outgoing);
const float4 pathScale = brdfFactor * cosTheta / brdfPdf;
const float rrSurviveProb = fminf(1.0f, Math::maxComponent(pathScale));
if (rrSurviveProb < aSample.cameraPathSamples[length].rrSample)
        break;
```

-continued

Listing 2

```
alpha *= pathScale / rrSurviveProb;
// Set up new state
ray = optix::make_Ray(payload.position, outgoing, rayTypeRadiance, camera.epsilon,
                TMAX);
    }
    return radiance;
}
```

In some cases, an alternative heuristic to deal with the weak singularities in light transport simulation may be implemented. See, for example, "Illumination in the Presence of Weak Singularities" (T. Kollig and A. Keller, in D. Talay and H. Niederreiter, editors, Monte Carlo and Quasi-Monte Carlo Methods 2004, pages 245-257. Springer, 2004), which is hereby incorporated by reference in its entirety.

For the example of integrating direct illumination over the surface of a light source, the weak singularity has been thresholded, while accounting for the loss by an integral over the solid angle:

$$L_d = \int_{suppL_e} L_e(y, x)V(x, y)f_r \min\left\{\frac{\cos\theta_x\cos\theta_y}{|x-y|^2}, b\right\} dy +$$

$$\int_{s_-^2(x)} L_e(y, x) \frac{\max\left\{\frac{\cos\theta_x\cos\theta_y}{|x-y|^2} - b, 0\right\}}{\frac{\cos\theta_x\cos\theta_y}{|x-y|^2}} f_r \cos\theta_x d\omega$$

with $y = h(x, \omega)$

In the context of thresholding in a path tracing framework with next event estimation, with the alias or inversion method at hand, scattering can be simulated with respect to measured materials and given a light source with area A, the bound $$b = \frac{1}{f_r A}$$

bounds the integrands by the source radiance $L_e$. Thus, comparing multiple importance sampling to the threshold method within the path tracing framework only requires replacement of the weights.

As the algorithms only differ in their weights, they actually trace the same set of rays and the difference with respect to computation time is negligible. The area A actually is determined by the light source selected or hit and thus influences the threshold b as well as the BRDF $f_r$.

For some scenes it may be insufficient to have a single technique for capturing specific lighting effects. A simple path tracer with next event estimation, for example, may be very inefficient in rendering directly seen caustics whereas a bidirectional approach can have an orders of magnitude higher pdf for such paths. One possible solution is to combine multiple techniques and weight them using implicit multiple importance sampling.

In one embodiment, a combination of bidirectional path tracing and progressive photon mapping using implicit multiple importance sampling may be implemented. In addition to bidirectional path tracing, density estimation may be performed at each camera vertex and the multiple importance sampling may be adapted to account for the new technique. In one embodiment, the weights may be implicitly computed such that it is not necessary to store the full path in memory.

Listing 3 shows pseudo code, in accordance with one embodiment.

Listing 3

```
- Trace N photons
    - At each non-specular surface intersection
        - Explicitly connect to camera
            and add its weighted contribution to image plane
- Build photon tree
- Trace N camera paths
    - At each light source hit
        - Add weighted contribution
    - At each non-specular surface intersection
        - Explicitly connect to a light
            source and add its weighted contribution
        - Perform density estimation and add its weighted contribution
        - Add weighted contribution of corresponding light subpath
```

In some situations it is advantageous to use only a subset of techniques. For example, path tracing and light tracing may be combined in a GPU implementation. Using implicit multiple importance sampling, a first pass renders the path tracing contribution with the appropriate weights, while in the second pass the contribution of the light tracer is added with the corresponding weights.

Further, in one embodiment, an implementation may utilize a combination of bidirectional path tracing and progressive photon mapping using implicit multiple importance sampling. Additional exemplary images associated with the techniques described herein may be found in U.S. Provisional Patent Application No. 61/667,362, filed Jul. 2, 2012, titled "Lightweight near-eye displays using light field displays and optical deconvolution," which is hereby incorporated by reference in its entirety.

Figure 7:
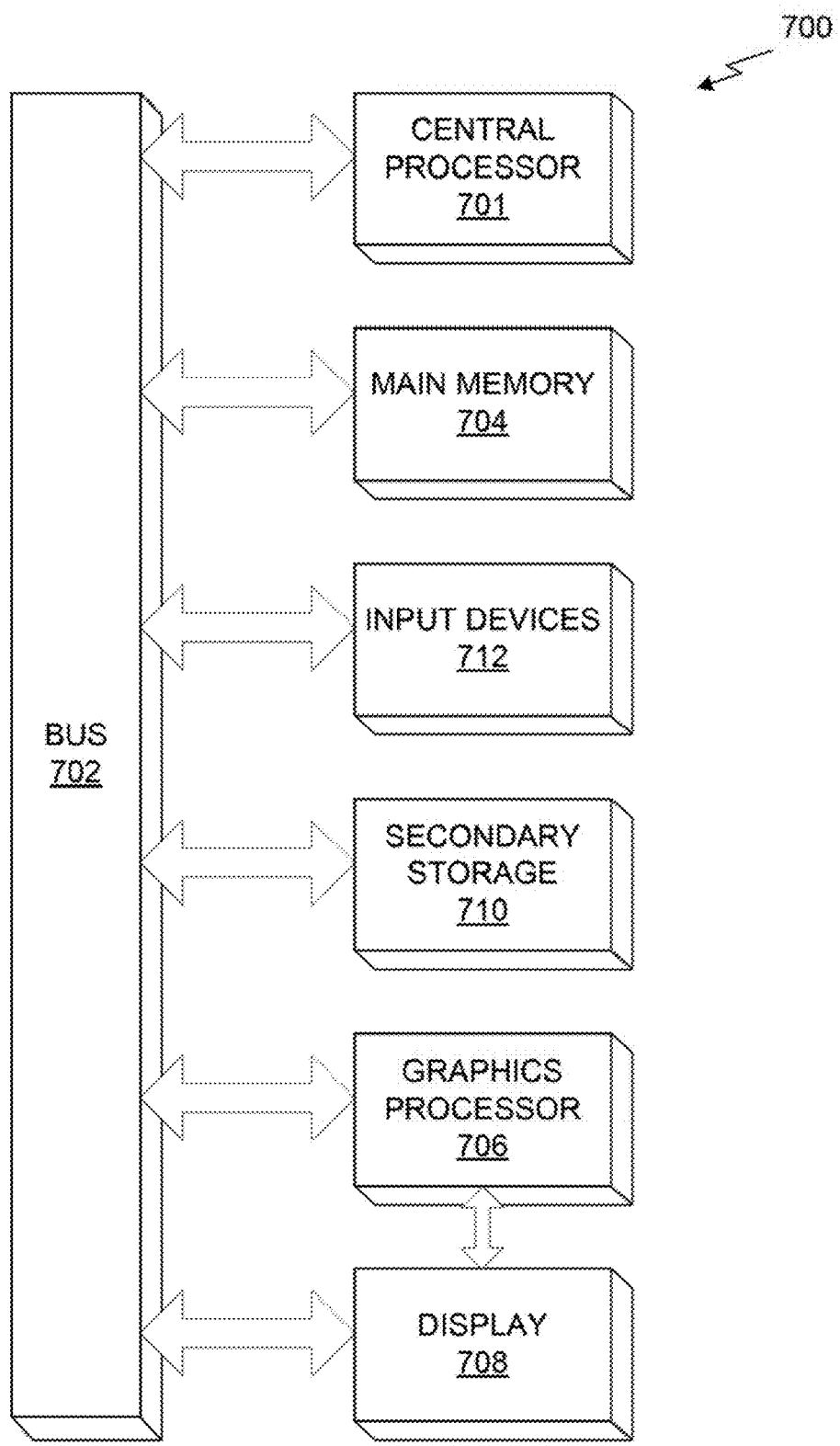
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examine a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   decomposing, by a system, a distribution function utilizing a technique for sampling from a probability distribution; and
   simulating, by the system, light transport associated with at least one scene utilizing information associated with the decomposed distribution function;
   wherein the technique for sampling from a probability distribution includes the Alias Method, and further comprising mapping low discrepancy sequences to the Alias Method.

2. The method of claim 1, wherein the distribution function includes a measured bidirectional reflectance distribution function (BRDF).

3. The method of claim 2, wherein decomposing the measured BRDF includes decomposing the measured BRDF into at least one first portion to be evaluated by shadow rays.

4. The method of claim 3, wherein decomposing the measured BRDF includes decomposing the measured BRDF into at least one second portion to be simulated utilizing scattering.

5. The method of claim 4, wherein simulating the light transport includes evaluating the at least one first portion utilizing the shadow rays.

6. The method of claim 5, wherein simulating the light transport includes simulating the at least one second portion utilizing scattering.

7. The method of claim 1, wherein decomposing the distribution function includes partitioning distributions.

8. The method of claim 7, wherein simulating the light transport includes simulating each of the partitioned distributions.

9. The method of claim 1, wherein the mapping of the low discrepancy sequences functions to allow simulating discrete densities without floating point computation.

10. The method of claim 1, wherein the distribution function is a measured BRDF and a partition distinguishes a portion that is easy to integrate and a portion that is efficient to simulate.

11. The method of claim 10, wherein the partition is applied to partition path space.

12. The method of claim 1, further comprising combining a bidirectional path tracing technique and a progressive photon mapping technique using implicit multiple importance sampling.

13. The method of claim 12, wherein the bidirectional path tracing technique and the progressive photon mapping technique are selected based on weights.

14. The method of claim 12, wherein the bidirectional path tracing technique and the progressive photon mapping technique are selected algorithmically.

15. A method, comprising:
    decomposing, by a system, a distribution function utilizing a technique for sampling from a probability distribution; and
    simulating, by the system, light transport associated with at least one scene utilizing information associated with the decomposed distribution function;
    wherein the technique for sampling from a probability distribution includes the Alias Method, and an integer portion of rational low discrepancy sequences is used as a permutation and index to access tables associated with the Alias Method.

16. A method, comprising:
  decomposing, by a system, a distribution function utilizing a technique for sampling from a probability distribution; and
  simulating, by the system, light transport associated with at least one scene utilizing information associated with the decomposed distribution function;
  wherein the technique for sampling from a probability distribution includes the Alias Method, and an alias probability table and an alias table resulting from the Alias Method are used to partition densities into a uniform portion and a non-uniform portion.

17. A non-transitory computer-readable storage medium storing instructions that, when executed by a processor, cause the processor to perform steps comprising:
  decomposing, by a system, a distribution function utilizing a technique for sampling from a probability distribution; and
  simulating, by the system, light transport associated with at least one scene utilizing information associated with the decomposed distribution function;
  wherein the technique for sampling from a probability distribution includes the Alias Method, and further comprising mapping low discrepancy sequences to the Alias Method.

18. A system comprising:
  a memory system; and
  one or more processing cores coupled to the memory system and that are each configured to:
    decompose a distribution function utilizing a technique for sampling from a probability distribution; and
    simulate light transport associated with at least one scene utilizing information associated with the decomposed distribution function;
    wherein the technique for sampling from a probability distribution includes the Alias Method, and further comprising mapping low discrepancy sequences to the Alias Method.

* * * * *